Jan. 16, 1951     O. E. HOSFORD     2,538,198
SEALING DEVICE HAVING INTERBONDED RIGID
AND FLEXIBLE MOLDED PORTIONS
Filed April 18, 1947     3 Sheets-Sheet 1
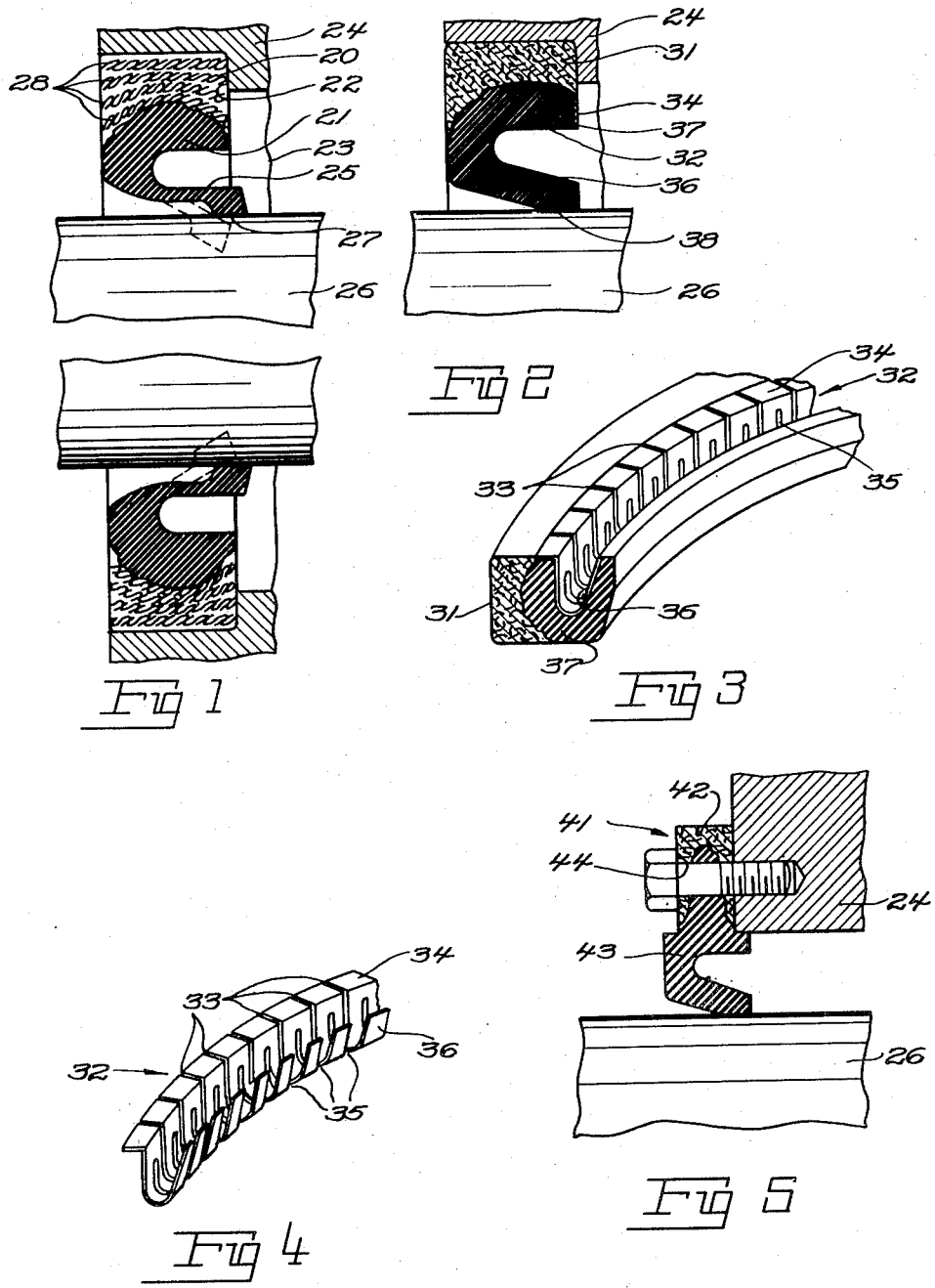
INVENTOR
OTTO E. HOSFORD
BY
ATTORNEYS

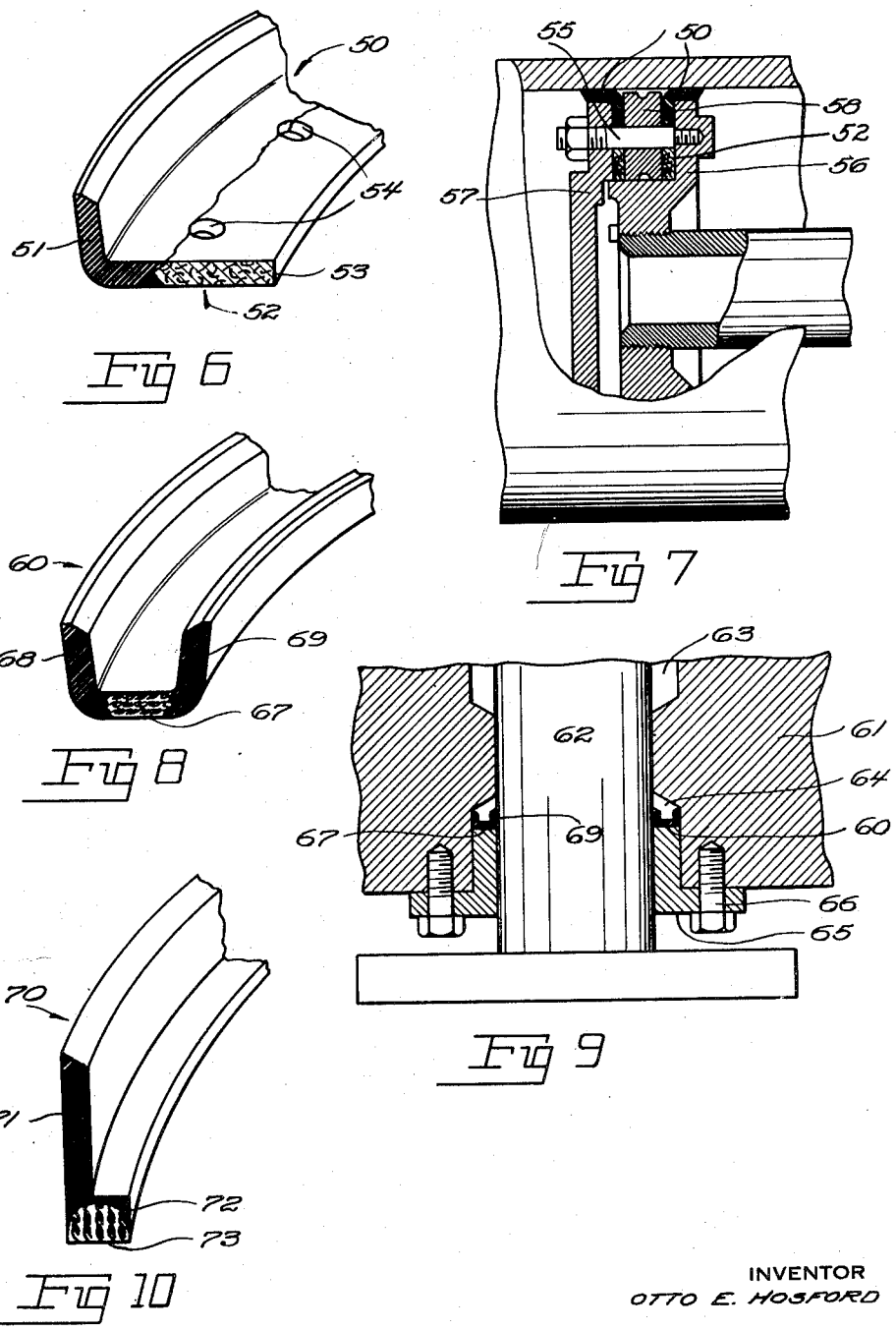

Jan. 16, 1951    O. E. HOSFORD    2,538,198
SEALING DEVICE HAVING INTERBONDED RIGID
AND FLEXIBLE MOLDED PORTIONS
Filed April 18, 1947    3 Sheets-Sheet 3

INVENTOR
OTTO E. HOSFORD
BY
Fraser, Myers & Manley
ATTORNEYS

Patented Jan. 16, 1951

2,538,198

UNITED STATES PATENT OFFICE 2,538,198

SEALING DEVICE HAVING INTERBONDED RIGID AND FLEXIBLE MOLDED PORTIONS

Otto E. Hosford, Palmyra, N. Y., assignor to The Garlock Packing Company, Palmyra, N. Y., a corporation of New York Application April 18, 1947, Serial No. 742,336

6 Claims. (Cl. 288—2)

This invention relates to improvements in sealing devices and more particularly relates to sealing rings such as may be employed as oil seals between two telescoping, relatively movable machine elements to prevent the passage of lubricant or dust or other foreign matter axially therebetween.

Such sealing rings, as may be used for example, for sealing an annular space between a machine casing and a shaft extending into an opening in the casing, usually have an annular flexible portion with a sealing flange which ordinarily effects a running seal with the shaft, and the flexible portion ordinarily is mounted within a rigid annular cup-shaped metal shell or base portion which may be press-fitted oil-tightly into the opening in the machine casing. This arrangement sometimes is reversed, the shell being press-fitted upon the shaft and the sealing flange of the flexible portion effecting a running seal with an annular inner surface of the casing or of an annular element fixed to the casing. In some instances the shell includes a flange by which, with bolts, such a device may be secured to one of the machine elements.

The provision of a metal shell involves not only the formation thereof, but also involves the separate production of other parts of the device such as the flexible sealing portion and a spring element which is sometimes employed to aid in pressing the sealing flange into firm sealing engagement with the shaft; and in addition, it is necessary, of course, to assemble the parts into the finished sealing device.

Various attempts have been made in the past to avoid the use of a metal shell by providing a hard molded base portion and a relatively soft molded sealing portion but difficulty was encountered in attempting to unite the two said portions. In some instances special bonding substances were employed, in other cases grooves were provided in the hard base and the sealing portion was molded to flow into the grooves. Other efforts involved providing separate packets of fabric plies, alternately impregnated with the plastic materials used in the base and in the sealing portion, these packets being molded between the two portions of the sealing device. The products of all these various efforts, however, either were not adequately durable or were quite expensive to produce.

When a sealing ring is designed and used as a piston cup, it is commonly mounted upon a piston head by clamping a radial mounting flange of the piston cup between clamping members of the piston. Ordinarily, such mounting flanges have been of relatively soft molded material similarly to the cylindrical sealing flanges thereof, and some difficulty has been encountered in that the soft material in the radial flange tends to flow outwardly under the axial compression thereof between the mentioned clamping members of the piston, thereby deforming the piston cup and causing it to wear out or become ruptured very quickly.

Also, where sealing rings are designed and employed as U-shaped piston cups mounted in a gland for sealing a piston rod, it is desirable to have a rigid base portion or web connecting the opposed sealing flanges of the ring; and the present invention enables the attainment of this desirable objective.

An important object of the present invention is the provision of a substantially non-metallic sealing device having a rigid annular base portion of a plastic material which, when cured, is relatively hard and rigid, and a sealing portion of relatively soft resilient plastic material, wherein an effective bond is provided between the said base and sealing portion over substantially the entire juncture area between the two without the use of separate adhesive material and without the necessity of employing any special connecting element for connecting the said two portions.

Another important object of the invention is the provision of a substantially non-metallic sealing ring of such a character that both a base portion of one type of plastic material and a sealing portion of another type of plastic material may be formed and firmly bonded together in a single forming and curing operation, and wherein, if spring means are desired in the sealing device, they may be incorporated thereinto in the same molding and curing operation.

Another important object is the provision of an annular sealing device having a rigid integral flange of plastic material by which the device may be bolted to a machine casing or a piston or other machine element.

Another important object is the provision of a sealing ring having a base portion of rigid plastic material to give the ring the capacity of retaining its form to enable it to be easily handled without damage to it and to function properly in use.

The foregoing and other objects are achieved by the present invention as should be apparent from the following description and the accompanying drawings of several illustrative embodiments of the invention.

In the drawings:

Figure 1 is a substantially central axial sectional view through a sealing device according to one embodiment of the present invention, in association with a machine casing and a shaft extending through an opening in the latter.

Fig. 2 is a view somewhat similar to the upper portion of Fig. 1 illustrating another embodiment of the invention.

Fig. 3 is a fragmentary view of a sealing device according to Fig. 2 showing said device both in cross-section and in perspective.

Fig. 4 is a view in substantially the same perspective as Fig. 3, showing, however, only the spring element of Fig. 3.

Fig. 5 is a view somewhat similar in character to Fig. 2, illustrating another embodiment of the present invention.

Fig. 6 is a fragmentary cross-sectional and perspective view of an L-shaped piston cup according to the present invention.

Fig. 7 is a fragmentary view of a cylinder and piston assembly partly broken away, to illustrate in axial section several piston cups according to Fig. 6 associated with a piston.

Fig. 8 is a fragmentary cross-sectional and perspective view of a U-shaped piston cup according to the present invention.

Fig. 9 is a more or less diagrammatic substantially central axial sectional view of a ram or piston and a gland therefor, including in the latter a U-shaped piston cup of the character illustrated in Fig. 8.

Fig. 10 is a fragmentary cross-sectional and perspective view of another type of piston cup according to the present invention.

Figure 11:
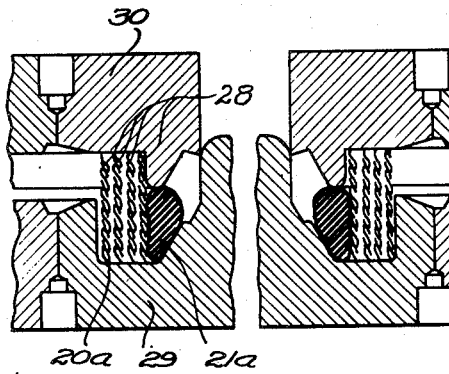
Fig. 11 is a substantially central sectional view of open mold elements with uncured blanks therein, showing one stage in the manufacture of a sealing device of the general character shown in Fig. 1.

Referring first to Figure 1, the oil seal therein illustrated comprises an annular mounting portion 20 of molded plastic material which, in the molding process, has become substantially compacted and substantially rigid; and securely bonded to said mounting portion by means hereinafter more fully described is an annular sealing portion 21 of molded relatively soft, resilient material. These two molded portions constitute the entire sealing device. The mounting portion 20 is oil-tightly press-fitted into a counter-bore 22 formed in an opening 23 in a machine casing 24 and the sealing portion 21 has a substantially resilient sleeve-like sealing flange 25 which extends around a shaft 26 and has an integral sealing lip 27 at the free edge thereof which, by the inherent resiliency of the sealing portion 21 and more particularly of the sealing flange 25, firmly engages the shaft and effects a running seal therewith.

The mounting portion 20, before molding, preferably is in the form of an annular blank 20a (Fig. 11) of plural plies 28 of rather coarse fabric, the several plies of which are somewhat separated and all plies thereof thoroughly impregnated with uncured plastic material such as, for example, powdered synthetic resin which, by curing, is plasticized and becomes relatively hard and rigid. The sealing portion 21 preferably is of rubber, synthetic rubber or other suitable relatively soft resilient rubber-like material (all of which hereinafter may be referred to for convenience as "rubber").

Figure 12:
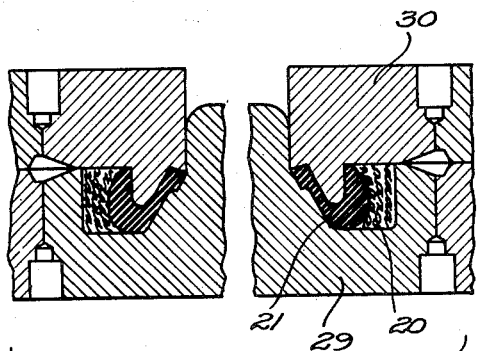
Fig. 12 is a view somewhat similar to Fig. 11 but showing the mold elements closed to give the blanks substantially their final shape.

As may best be understood from Figs. 11 and 12, an oil seal such as is shown in Fig. 1 may be formed under suitable heat and pressure in molds of suitable interior design, a lower mold section being designated as 29 and an upper mold section being designated as 30. In forming the oil seal the blank 20a is disposed as shown in an outer portion of the lower mold cavity and an annular blank 21a of uncured soft rubber is placed in said cavity in position nested within the blank 20a. The blank 20a may be conveniently formed initially by spirally winding a length of plastic-impregnated fabric loosely to a sufficient number of plies and then, if necessary, the fabric spiral may be further impregnated with the selected plastic material. Being thus loosely assembled and being of rather coarse texture, it is capable of being very substantially compacted under heat and pressure. The blank 21a of soft rubber is relatively non-compressible but easily deformable in curing under heat and pressure.

When the mold sections are closed in the presence of heat and pressure, the blank 20a, as may best be seen by comparing Figs. 11 and 12, is substantially compacted to about one-half or perhaps less than one-half of its original size. During the molding process, the material of the blank 21a flows upwardly and somewhat inwardly in mold; also, the plastic material with which the blank 20a is impregnated becomes plasticized and firmly imbedded and pressed into and between the woven fabric strands and between the several plies of the fabric. Apparently also while the rubber material of the blank 21a is still more dense than the blank 20a, (i. e., before the latter has become fully compacted and the plastic material therein fully plasticized), the said rubber material is firmly pressed toward the blank 20a and finds its way to some extent into gripping association with the surface fibers at the near side of the adjacent layer of fabric in the blank 20a. In other words, the said surface fibers of said fabric layers become embedded in the rubber, and experience shows that only such surface fibers become so embedded.

Due to the mentioned rubber impregnation of the surface fibers of the fabric layer of blank 20a which lies adjacent to the blank 21a over the entire juncture area between the two blanks, a very firm union is derived between the annular mounting portion of rigid plastic material and the annular sealing portion of soft flexible material.

In Fig. 1 the sealing flange 25 is shown in broken lines in substantially its unflexed condition as before it is placed around the shaft. It may be seen that when the sealing device is slid onto the shaft the sealing flange 25 is stretched radially outwardly and is strongly pre-loaded on the shaft, so that the sealing lip 27 engages the shaft firmly to effect a good running seal therewith.

It may be observed from Figs. 1 and 12 that the juncture line between the mounting portion 20 and the sealing portion 21 is channel-shaped with the concave side of the channel facing the shaft. This channel-like juncture may result partly from the relatively dense rubber material of the blank 21a forcing its way horizontally outwardly in the mold at a point intermediate the top and the bottom of the less dense blank 20a.

Although it is not certain exactly what takes place in the mold, nevertheless it appears that after the blank 20a has become partially compacted, the portions of the material of both blanks which engage the inner mold surfaces may have a tendency either to stick to those surfaces or at least to be restrained to some extent by friction against sliding with respect to the mold surfaces so that the effect of the pressure to which the blanks are subjected is substantially concentrated toward the interior of the blanks. Such internally acting force would tend to cause the rubber of the blank 21a to press the plies 28 toward each other intermediate their side edges to a greater degree than at such side edges so that the plastic material in the blank 20a, upon becoming plasticized, would have a tendency to fill out the spaces between the plies adjacent the opposite edges thereof, thus yielding the channeling effect. This channeling effect is desirable for it obviously affords a greater juncture and bonding area than if a straight line bonding were effected extending from one radial face to the other of the oil seal. In order to derive a substantial channeling effect of this nature it has been found helpful in forming the blank 20a to make the outer ply or plies narrower than the others and have the other plies wider with the innermost ply or plies the widest of all. In this arrangement the innermost ply or plies, even after molding, are wider than the final axial width of the device and hence extend inwardly about both sides of the rubber portion 21 to some extent to accentuate the channeling effect. Thus, it will be seen that both because of the mentioned channeling effect and because the rubber material impregnates the surface fibers of the adjacent fabric to some extent in the curing operation, a very firm union is attained between the mounting portion 20 and the sealing portion 21.

An important difference between the oil seal illustrated in Figs. 2, 3 and 4 and the oil seal of Fig. 1 is that the former has a mounting portion 31 of random fibers, rather than fabric, impregnated with suitable cure-hardened rigid plastic material; and also includes a bonded-in annular finger spring 32 of flat spring material. The term "random-fibrous material" and similar expressions employed herein and in the accompanying claims refer to material which is matted rather than woven so that the fibers or matted yarn do not extend in any orderly arrangement. The terms "fabric," "fabric material" and similar expressions refer to woven material in which the fibers or yarn are constrained to an orderly arrangement by reason of being woven.

The spring 32, as may best be understood from Fig. 4, is formed of flat spring material slotted at 33 to articulate a radial flange 34 to enable the latter to be conveniently formed into a circle; and slots 35 defining the sides of resilient fingers 36. As best seen in Figs. 2 and 3, the flange 34 is imbedded into the right or upper face of the annular sealing portion 37 and may even be partially imbedded in the corresponding face of the annular mounting portion 31, depending upon the extent to which the material of the said mounting portion flowed inwardly at that face during the molding of the device. The fingers 36 of the spring are substantially U-shaped and are imbedded in a re-entrant part of the sealing portion 37 with the outer ends of the said fingers pressing inwardly upon the sealing flange 38 to urge the latter into firm running sealing engagement with the shaft 26.

The oil seal of Figs. 2 and 3, like that of Fig. 1, requires only a single molding operation wherein a blank which is somewhat similar to blank 20a but has a body of random fibers rather than of fabric, is associated with a rubber blank somewhat like blank 21a in a mold area such as is shown in Figs. 11 and 12, but with suitably differently shaped molding cavities. Prior to the closing of the mold the spring 32 is placed in position adjacent the top and inner side of the rubber blank and then the two blanks and the spring are subjected simultaneously to heat and pressure in the molding operation. In the molding operation the rubber of the rubber blank flows into the slots 33 and 35, thereby firmly imbedding the spring into place and, apparently by the concentration of the effect of internally acting pressure in the sealing portion 37 the rubber material forming that portion tends to channel into the adjacent side of the impregnated fibrous material constituting the mounting portion 31, thus giving a substantial juncture area. Also, in the molding operation the rubber material of the rubber blank is pressed substantially into adjacent surface portions of the fibrous material of the other blank. Stated differently, the fibers at the surface of the body of fibrous material partially enter and are enveloped by the rubber of the rubber blank and because of this and also because of the somewhat enlarged channel-shaped juncture area a firm union is established between the mounting portion 31 of rigid plastic material and the sealing portion 37 of relatively soft resilient rubber material.

In prior structures employing metal shells as a mounting means, the shell served not only as an element for carrying a sealing element but also served to hold a spring in place in seals wherein a spring was employed. Obviously according to the present invention as explained with reference to Figs. 1, 2, 3 and 4 all the functions of the metal shell are retained while the shell nevertheless is dispensed with.

Fig. 5 illustrates an oil seal having the general sealing characteristics of those already described but including also a mounting flange 41 having a rigid portion 42 of random-fibrous material impregnated with suitable plastic material which in curing has become hard and rigid. It may be observed from the drawing that the rubber of the resilient sealing portion 43 has channeled very substantially into the rigid portion 42. Such a substantial channeling effect may be induced by initially channeling to some extent the impregnated fibrous blank of the rigid portion 42 before the molding operation. If desired also, the rubber blank may be formed with an annular ridge to extend into the channel initially formed in the fibrous blank so that when the two are molded together the channeling effect will be very substantial, as shown in the drawing. After the sealing element has been completely molded, bolt holes 44 may be punched or drilled in the flange 41 at suitably spaced intervals therearound to enable the sealing device to be bolted to the machine casing 24.

In Fig. 6 is shown an L-shaped (in section) piston cup 50 having a cylindrical sealing flange 51 and a radial mounting flange 52. The said sealing flange and the adjacent portion of the mounting flange may be of molded soft resilient rubber and the inner portion of the flange 52 may be of random-fibrous material 53 impregnated with a suitable plastic material made hard and rigid by curing. In forming this piston cup a rubber blank and a plastic impregnated blank of fibrous material are molded together substantially in the manner hereinbefore described. As may be observed from the drawing, the impregnated fibrous portion 53 is channeled into the soft rubber portion 51 but the juncture of the two materials is somewhat irregular circumferentially. This may be true in varying degrees in other sealing devices hereinbefore described and this irregularity undoubtedly also contributes to some extent in enhancing the union between the rigid portion and the soft rubber portion of the sealing device. Bolt holes 54 may be provided in the mounting flange 52 at suitably spaced circumferential points to facilitate mounting of the piston cup in a piston structure.

As shown in Fig. 7, two piston cups 50, facing in opposite directions, are secured by stud bolts 55 between a piston head 56 and a circular clamping plate 57, a spacer ring 58 being interposed between the two piston cups. If the piston cup 50 were made entirely of molded rubber as has been the practice in the past, the rubber of the radial flange 52 would tend to flow outwardly under the clamping pressure thereon and this would impair the sealing effectiveness of the piston cup by forcing the mounting flange 52 partially into the area between the piston and the adjacent cylinder wall. This would tend to have some binding effect, thus using more power than necessary and also would strongly tend to cause rapid wear of the piston cup at the juncture of the two flanges of the cup. By forming a substantial part of the mounting flange 52 of rigid material, as described herein, the capacity of that flange to be compressed axially is substantially limited; hence there would be no material compressive force effective upon the soft rubber portion of the mounting flange which could cause this rubber portion to flow outwardly and cause the difficulties hereinbefore mentioned. For these reasons, a piston cup according to the present invention is considered to be superior to prior conventional molded piston cups.

In Fig. 8 is shown a U-shaped piston cup or ring 60 having a rigid annular radial web 67 which may advantageously be of several plies of coarse fabric impregnated, to give it rigidity, by cure-hardening plastic material of suitable character. The web 67 preferably serves as connecting and supporting means for outer and inner cylindrical sealing flanges 68, 69 which are substantially integrated with the web 67 by being molded together substantially in the manner already explained with reference to other embodiments of this invention.

In Fig. 9 is shown one way in which a sealing ring such as the piston cup 60 may be employed as means for effecting a seal between a hydraulic ram cylinder 61 and a ram 62. Fluid under pressure in the ram chamber 63 is prevented from leaking downwardly by the piston cup 60, which is retained within an annular gland 64 by a gland ring 65 held in place by bolts 66. If the U-shaped piston cup 60 in this assembly were entirely of soft resilient molded rubber or similar soft material like some prior piston cups, the inner sealing flange 69 would have a strong tendency to drag upwardly as a result of its frictional engagement with the ram 62, as the latter moves upwardly, and this would probably cause the piston cup to break down very quickly. However, with the web 67 rigid and integrated with the two sealing flanges according to this embodiment of the present invention, the web 67 remains in its normal attitude to the outer ram surface at all times and the mentioned dragging effect is substantially obviated, thus prolonging the life of the piston cup.

Piston cups of the general character shown in Fig. 8 are sometimes clamped by their radial webs to a piston head or other equivalent machine structure. If the said web were of the same soft molded material as the sealing flanges, the clamping force, in many instances, would cause radial flowing inwardly and outwardly of the said web portion in much the same manner as hereinbefore described with reference to the mounting flange 52 of the piston cup shown in Fig. 6 and with very similar disadvantages. In contrast, a piston cup of the design of Fig. 8 according to the present invention, by employing the rigid, impregnated-fabric web 67, obviates all such flowing tendencies and thereby very substantially prolongs the life of the piston cup.

In Fig. 10 is disclosed a special type of piston cup 70 having a cylindrical sealing flange 71 of substantial axial length, and preferably of molded relatively soft resilient material, molded to a radial base ring 72 consisting for the most part of a rigid portion 73 formed of plural plies of fabric impregnated with rigid cure-hardened plastic material suitable for the purpose. The base ring 72 serves as a mounting portion by which the piston cup may be secured to a piston. The rigid portion 73 of the base ring 72 gives the piston cup adequate circumferential rigidity and also prevents cold flow of the piston cup at its mounting point, thereby avoiding the already-explained undesirable results of such cold flow.

Figure 13:
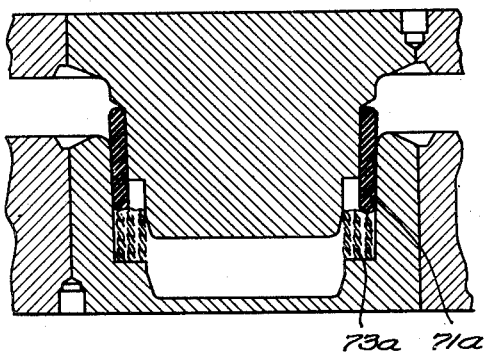
Fig. 13 is a substantially central sectional view of open mold elements with uncured blanks therein, showing one stage in the manufacture of a piston cup of the general character shown in Fig. 10.
Figure 14:
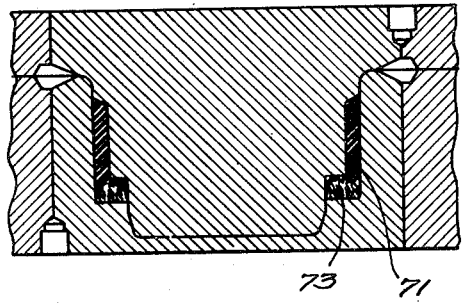
Fig. 14 is a view somewhat similar to Fig. 13 but showing the mold elements closed to give the blanks substantially their final shape.

Figs. 13 and 14, by comparison with Figs. 11 and 12, show that a piston cup generally like that illustrated in Fig. 10 may be molded in much the same manner as the sealing device of Fig. 1 is molded. The principal difference between the formation of the sealing device according to Fig. 1 as shown in Figs. 11 and 12 and the formation of a piston cup of the character shown in Fig. 10 in the manner illustrated in Figs. 13 and 14, resides in the fact that in the latter instance an annular rubber blank 71a is placed in the mold adjacent to edge portions of plural fabric plies in a blank 73a in said mold rather than adjacent to a face portion of a ply of fabric. Although the joining of the soft rubber portion, according to Figs. 11 and 12, in face to face relationship to an adjacent side of a fabric ply of the mounting portion yields a satisfactory bonding of the two, nevertheless, the bonding may be somewhat enhanced when done according to Figs. 13 and 14 for the reason that, in the curing process, the material of the rubber blank 71a may flow quite freely between the several plies of fabric at marginal portions thereof adjacent to the rubber blank.

It should be perceived from the foregoing description that the present invention yields all the objects herein ascribed thereto.

It may be noted also that although some described embodiments include one or more plies of coarse fabric in the hard mounting portion or its equivalent and others included random fibrous material in said mounting portion, nevertheless, both the fabric and the random-fibrous material are "fibrous" materials in the strictest sense of the word. Therefore, as a matter of convenience in the following claims, the terms "fabric" and "random-fibrous material" are used as referring specifically to the two specific types of such materials shown and described herein and the term "fibrous material" is used as referring generically to either or both such types of materials.

Although there have been disclosed in the foregoing specification and in the accompanying drawings several embodiments of sealing elements and the method of making the same according to the present invention, nevertheless it should be understood that the said embodiments are merely illustrative of several of many specific means of utilizing the concept of the invention; therefore, it should be understood that the present invention is not to be limited in scope except as particularly indicated in the following claims.

What I claim is:

1. A sealing device for sealing a space between two relatively movable machine elements, comprising a sealing portion of relatively soft flexible molded material for effecting a slip seal with a cylindrical surface of one of said elements, and a mounting portion adjoining said sealing portion for mounting said device in association with the other of said elements and for effecting a stationary seal relatively thereto, the mounting portion being of relatively rigid molded material with fibrous material therein extending throughout the mass of a substantial part of said mounting portion which is adjacent to the juncture between the two said portions, and surface fibers only of said fibrous material being embedded in the soft material of said sealing portion at said juncture and over substantially the entire area of the said juncture.

2. A sealing device according to claim 1, the said juncture being in the shape of an annular channel.

3. A sealing device according to claim 1, the said fibrous material being random-fibrous material.

4. A sealing device according to claim 1, the said fibrous material comprising plural plies of fabric which extend in substantial parallelism to said juncture.

5. A sealing device according to claim 1, the said fibrous material comprising a plurality of plies of fabric in substantially face to face relationship with substantial portions of corresponding edges of plural plies disposed adjacent said juncture area.

6. A sealing device according to claim 1, the said juncture being at an annular channel in the mounting portion, and the device being formed with circumferentially spaced bolt holes therein extending axially through rigid mounting portion material forming the sides of said channel and through soft sealing flange material which extends within said channel.

OTTO E. HOSFORD.

REFERENCES CITED

The following references are of record in the file of this patent:

UNITED STATES PATENTS

| Number | Name | Date |
|---|---|---|
| 1,356,783 | Oglivie | Oct. 26, 1920 |
| 1,466,086 | Christenson | Aug. 28, 1923 |
| 1,470,442 | Grosjean | Oct. 9, 1923 |
| 1,702,958 | Bard | Feb. 19, 1929 |
| 1,969,008 | Hubbard | Aug. 7, 1934 |
| 2,052,603 | Christenson | Sept. 1, 1936 |
| 2,081,040 | King | May 18, 1937 |
| 2,088,703 | Hubbard et al. | Aug. 3, 1937 |
| 2,218,638 | Christenson | Oct. 22, 1940 |
| 2,256,863 | Esterson | Sept. 23, 1941 |
| 2,264,148 | Fisher et al. | Nov. 25, 1941 |
| 2,370,913 | Procter | Mar. 6, 1945 |
| 2,372,095 | Leistensnider et al. | Mar. 20, 1945 |

FOREIGN PATENTS

| Number | Country | Date |
|---|---|---|
| 544,732 | Great Britain | of 1942 |
| 544,904 | Great Britain | of 1942 |